United States Patent [19]

Nestrick et al.

[11] 4,199,330

[45] Apr. 22, 1980

[54] BONDED ORGANO-PELLICULAR PACKINGS FOR CHROMATOGRAPHIC COLUMNS

[75] Inventors: Terry J. Nestrick; Rudolph H. Stehl, both of Midland, Mich.

[73] Assignee: The Dow Chemical Company, Midland, Mich.

[21] Appl. No.: 5,274

[22] Filed: Jan. 22, 1979

Related U.S. Application Data

[63] Continuation of Ser. No. 877,058, Feb. 13, 1978, abandoned.

[51] Int. Cl.² .................. B01D 15/08; B01J 31/02
[52] U.S. Cl. ................................ 55/67; 55/386;
252/428; 252/429 R; 252/430; 252/441;
568/750; 568/758
[58] Field of Search .............. 252/428, 429 R, 430,
252/431 R, 441, 449; 55/67, 386; 210/31 C, 198
C

[56] References Cited

U.S. PATENT DOCUMENTS

| | | | |
|---|---|---|---|
| 3,417,028 | 12/1968 | Montgomery et al. | 210/198 C |
| 3,664,967 | 5/1972 | Stehl | 252/431 R |
| 3,722,181 | 3/1973 | Kirkland | 55/67 |
| 3,817,931 | 6/1974 | Brooks et al. | 252/449 |

OTHER PUBLICATIONS

Journal of Chromatography, 135, pp. 261–272 (1977), by Sadao Mori.
Journal of Chromotographic Science, vol. 12, pp. 161–172 (4/1974), by Halasz et al.
Journal Chromotogr. Sci.; 8, 309 (1970), Kirkland.
Journal Chromotogr. Sci.; 9, 206 (1971), Kirkland.
Journal Chromotogr. Sci.; 11, 120–128 (1973), Locke.
Journal Chromotogr. Sci.; 12, 337–343 (1974), De Stefano et al.
Chromatographia; 8 (12), 661–668 (1975), Kirkland.
Anal. Chem.; 44 (1), 90–92 (1972), Locke et al.

*Primary Examiner*—P. E. Konopka

[57] ABSTRACT

Highly effective chromatographic column packings are prepared by reacting hydroxyl groups on a silica surface with $SiCl_4$ and then reacting the chlorosilylated surface with a polyglycol or polymeric glycol ester in a slurry reaction. Residual chlorosilane groups on the reacted surface are neutralized by reaction with methanol or other lower alkanol. The resulting modified silica has a bonded, essentially monomolecular organic surface film which provides thermal stability, uniform efficiency, and rapid analysis when the material is used as a column packing in gas-liquid chromatography.

20 Claims, No Drawings

BONDED ORGANO-PELLICULAR PACKINGS FOR CHROMATOGRAPHIC COLUMNS

CROSS-REFERENCE TO RELATED APPLICATION

This is a continuation, of application Ser. No. 877,058 filed Feb. 13, 1978, now abandoned.

BACKGROUND OF THE INVENTION

This invention relates to improved silica packings for use in chromatographic analysis and to a process for making them. It relates particularly to finely divided silica supports having a very thin polymeric organic film chemically bonded to their surface.

The problem of optimizing chromatographic performance is one that has persisted throughout the history of chromatographic separations. Although significant advances have been made in the application of gas-liquid chromatography to analytical problems, most of these have resulted from improvements in apparatus rather than in the column packing itself.

In order to avoid or minimize problems caused by active sites on the surface of a silica chromatographic column packing, coated packings have been prepared by heating an activated silica with an appropriate alcohol under conditions which allow continuous removal of water, thereby causing etherification of the alcohol with silanol groups on the silica surface, see Halasz et al., J. Chrom. Sci., 12, 161 (1974). However, the coating obtained is often not uniform and the method gives poor reproducibility. Stehl, U.S. Pat. No. 3,664,967 describes a method whereby a silica or alumina gel is reacted with an organohalosilane, the halosilane groups thus attached to the surface are reacted with an alcohol and the product is halogenated to provide a haloorganic coating bonded to the support surface. However, the improved chromatographic packings thus obtained are still not entirely satisfactory.

SUMMARY OF THE INVENTION

It has now been found that novel chromatographic packings of uniformly high quality are produced by a process which comprises (1) contacting an activated silica support having a significant proportion of hydroxyl groups bonded to silicon atoms at the support surface with silicon tetrachloride at about 50° C.–300° C. for a time sufficient to react essentially all of said hydroxyl groups, thereby producing a chlorosilylated surface, (2) reacting by contacting the chlorosilylated surface with an inert solvent solution of a polyol having an average molecular weight of at least about 3,000 at a temperature of about 100° C.–250° C., (3) contacting the polyol-chlorosilylated surface reaction product with a lower alkanol in sufficient quantity to neutralize residual chlorosilyl groups, and (4) separating the neutralized product from the reaction mixture as an essentially pure and dry solid. The reaction product has a uniform, chemically bonded organic surface coating which is essentially monomolecular in thickness. This bonded coating provides substantially complete surface coverage and reduces surface activity to a minimum.

DETAILED DESCRIPTION OF THE INVENTION

The chromatographic packings of this invention offer the advantages of high thermal stability, increased selectivity, controllable functionality, reduced analysis time, low reactivity to sample components, and sharp separation of solute species at lower temperatures than those required for elution on conventional coated packings.

These advantages are obtained by following the above-described process steps and they are maximized by following those steps in their preferred modes of operation. For example, the surface of a silica support is preferably specially activated to provide a larger number of hydroxyl groups bonded to the surface silicon atoms by treating a cleaned silica with vaporized concentrated hydrochloric acid at about 100° C.–300° C. for 0.5–5 hours. The vaporized aqueous HCl is most conveniently applied as a mixture with an inert gas such as nitrogen, argon, helium or the like.

The hydroxy (or silanol) groups on the silica surface are then reacted with silicon tetrachloride in either a slurry reaction with the liquid reagent or, preferably, by a gas-solid reaction in which $SiCl_4$ vapors are contacted with a bed of the silica particles. In either case, the $SiCl_4$ reaction is carried out at about 50° C.–300° C., preferably at about 150° C.–250° C. for the gas phase reaction, at a somewhat lower temperature for the reaction with liquid silicon tetrachloride in order to avoid excessive reactor pressure. This chlorosilylation reaction is preferably carried to the extent of about 0.002 to about 0.01 gram atoms of silicon-bound chlorine per square meter of silica surface.

The reaction of the chlorosilylated product with the polyol or polyester polyol is carried out at about 100° C.–250° C. by contacting the liquid polyol reactant with the solid chlorosilylated silica in a slurry reaction, preferably in the presence of an inert solvent for the polyol. Suitable solvents are those boiling at or above 100° C. and inert to both reactants under the reaction conditions. Aromatic hydrocarbons such as xylene, diethylbenzene, and durene are examples.

Lower alkylene polyglycols of at least 3,000 average molecular weight are preferred polyol reactants. These include polyethylene glycol, polypropylene glycol, polybutylene glycol, block copolymers of two or more of these oxyalkylene units, and physical mixtures of any of these. The minimum molecular weight is a measure of the minimum length of molecule required to give effective surface coverage and consequent surface deactivation. For polyethylene glycol, the minimum molecular weight indicates a chain of 65–70 oxyethylene units in the average molecule. For polypropylene and polybutylene glycols, molecular weights of about 4,000 and 5,000, respectively, correspond to molecules of similar length. Polyglycols having an average molecular weight of about 100,000 represent a practical maximum molecular size limit.

Polyester polyols are another class of polyol reactant. Polymers made by esterifying an alkylene diol of 2–16 carbon atoms with a dicarboxylic acid of 3–10 carbon atoms are preferred examples. Alkylene diols include ethylene glycol, propylene glycol, butylene glycol, diethylene glycol, triethylene glycol, dibutylene glycol, trimethylene glycol, 1,4-butanediol, and 1,12-dodecanediol, also mixtures of these. Aliphatic dicarboxylic acids such as malonic acid, succinic acid, and sebacic acid are preferred although aromatic diacids such as terephthalic acid and isophthalic can also be used, alone or in mixture with acids defined above. The polyesterification reaction is normally carried out for convenience with the diacid chloride. Other reactive dihalides can be mixed in minor proportion with the diacid chloride reactant in the polyesterification reaction to vary the properties of the resulting polymer, for example, organic silicon dichlorides, disulfonyl dichlorides, and the like. A minimum molecular weight of about 3,000 is also appropriate for polyester polyol reactants. Preferably, the polyester polyol is prepared in situ, in the presence of the chlorosilylated silica so that the polyesterification reaction and the reaction of the polyol molecules with the chlorosilyl groups take place more or less simultaneously When the reaction of the polyol or polyester polyol reactant with the chlorosilylated silica has essentially ceased, a small proportion of unreacted chlorosilyl groups remains on the silica surface. In order to eliminate these highly undesirable active groups, they are neutralized by adding a lower alkanol such as methanol, ethanol, or isopropyl alcohol to the reaction mixture and heating as before. Preferably, an intermediate neutralization with a lower molecular weight and consequently more reactive polyol is carried out, most preferably with a series of such polyols of progressively decreasing molecular weight. In this way, the silica surface is blanketed to the greatest extent possible with bonded molecules of maximum length. For example, chlorosilylated silica can be reacted with polyethylene glycol of 20,000 molecular weight and remaining silicon-bound chlorine atoms then neutralized by successive reactions with polyethylene glycols of 5,000 and 1,000 molecular weight, then with triethylene glycol, and finally with methanol to ensure the netralization of all possible residual chlorosilyl groups.

Preparation of Silica Surface

About 100 g portions of 30–100 mesh Chromosorb W, a flux-calcined celite diatomaceous silica specially processed for chromatographic use by Johns-Manville Corp., were extracted for 24–72 hours in a Soxhlet extraction apparatus with constant boiling hydrochloric acid. The extracted silica was put in a washing column and washed for 12–24 hours with deionized water at room temperature using a fluid bed back-flushing procedure to remove acid and fines. The washed silica was rinsed thoroughly with methanol and then dried by passing filtered air through the column for about two hours. The dried silica was stored in closed glass bottles until subjected to surface reaction.

The silica surface was activated by packing about 30 g of the acid-extracted silica in a glass reactor tube heated by a clamshell electric furnace and passing about 45 ml/min nitrogen through the bed while its temperature was raised in 40° C. steps to 200° C. over a period of about 40 minutes, then the incoming nitrogen was switched through a conc. HCl bubbler so that the nitrogen passing through the bed was essentially saturated with HCl and water vapor. The HCl-saturated nitrogen stream was continued at 200° C. at the same rate for three hours, then the bubbler was bypassed and the bed was flushed with pure nitrogen for one hour, also at 200° C.

Reaction with $SiCl_4$

At this point, a bubbler charged with $SiCl_4$ was connected into the nitrogen supply line and the silica bed was contacted with $SiCl_4$ vapor in nitrogen for 90 minutes, the temperature and nitrogen flow rate remaining constant at the prior levels. The bed of chlorosilylated silica was then flushed with nitrogen as before for 15 minutes and allowed to cool to room temperature after removal of the furnace with continued flow of nitrogen.

The following procedure was employed with modifications as noted for the reaction of the chlorosilylated silica with a polyglycol. A somewhat modified procedure was used for the corresponding reaction of a polyester polyol as described in those examples.

Reaction Procedure

A glass reactor flask equipped with reflux condenser and nitrogen inlet was charged with about 10 g of polyglycol reactant and 300 ml of o-xylene and the contents refluxed for about an hour with dry nitrogen flush to remove small amounts of water, then the contents were cooled to 110° C. and about 30 g of the chlorosilylated silica were added under nitrogen. Nitrogen flow through the flask was reestablished and the reaction mixture was heated at reflux temperature for 2–24 hours. The reaction was then quenched by successive addition of polyethylene glycols as described in the examples while maintaining reflux temperature. The reactor was then cooled to 100° C., the heat source was removed, and 50 ml of anhydrous methanol were added slowly to neutralize any residual chlorosilane groups. After the addition was completed and the reaction mixture had cooled to about 55° C.–60° C., the liquid in the reactor flask, consisting essentially of xylene and unreacted polyglycols, was decanted and the reacted silica was washed by decantation with three portions of methanol followed by three portions of chloroform. The washed silica was then carefully transferred to a washing column where it was thoroughly washed by gravity flow with successive 300 ml portions of methanol, chloroform, and methylene chloride. The washed silica was then dried by drawing filtered air through the column for about an hour. The finished bonded silica packing was stored in sealed glass bottles until used. The product was a free-flowing fine white powder.

EXAMPLE 1

Chlorosilylated 100–120 mesh Chromosorb W was reacted with polyethylene glycol of 20,000 average molecular weight (E-20,000) by the procedure described above. The reaction was quenched by adding about 2 g of melted polyethylene glycol of 6,000 average molecular weight (E-6,000), refluxing the reaction mixture for about 20 minutes and repeating this procedure with successive 2 g portions of polyethylene glycols E-4,000, E-1,000, and E-400 and, finally, diethylene glycol. The reacted silica was then treated with methanol and washed and dried by the previously described procedure.

For purpose of comparison, "bonded" or coated silica packings were prepared by coating 100–120 mesh Chromosorb W-HP with polyethylene glycol of 20,000 molecular weight in quantities sufficient to produce loadings of 5 percent and 3 percent by weight using the conventional slurry method (described by Halasz et al., J. Chrom. Sci., 12, 161 (1974). These packings were preconditioned for 12 hours at 220° C. and 60 ml/min helium flow.

These packings were compared in a 2.1 mm × 160 cm column maintained at 75° C. and using 300 µg/ml n-dodecane in methylene chloride as the test solute and helium as the carrier gas. Column efficiency for each packing at optimum carrier flow was calculated from the plot of test results and is listed in Table 1.

TABLE 1

| Column Packing | Plate Height, mm/Theoretical Plate | Optimum Carrier Flow ml/min |
|---|---|---|
| bonded | 0.34 | 55 |
| coated, 5% | 0.67 | 27 |
| coated, 3% | 0.62 | 32 |

It is apparent that the bonded packing provided substantially greater efficiency in terms of plate height and also offers faster analysis times since the optimum carrier flow was about twice that for the coated packings prepared by a previously known method.

EXAMPLE 2

A bonded packing was prepared as in Example 1 using 80-100 mesh Chromosorb W and about 8 g of polyethylene glycol of 4,000 average molecular weight (E-4,000). Polyglycols used in the quench cycle of the process were polyethylene glycols of 1,000 and 600 molecular weight, tetraethylene glycol, and diethylene glycol respectively. This packing was compared with a conventionally prepared polyester-coated silica packing by the method of Example 1 in the analysis of impurities in 1,2-dibromo-3-chloropropane, a commercial soil fumigant. Both packings showed the presence of allyl chloride and 1,2,3-tribromopropane in the product but the bonded packing of this invention also showed the presence of 1,2,5,6-tetrabromohexane which was not previously observed using the conventional packing. Additionally, use of the bonded packing cut the analysis time in half.

EXAMPLE 3

Bonded packings were also prepared by the method of Examples 1 and 2 using polyethylene glycols with average molecular weights of about 6,000 and about 1,500. Chromatographic testing showed excellent results for the first of these, comparable with results obtained with the products of Examples 1 and 2. However, the bonded packing made with E-1,500 showed severe peak tailing, characteristic of high surface activity. Evidently, for packings having a bonded polyethylene glycol layer, the minimum average molecular size that provides adequate surface coverage is in the molecular weight range of about 3,000, corresponding to polymers having about 65-70 oxyethylene units in the polyglycol molecule.

This conclusion was supported by the properties of a bonded polyglycol packing described in Example 4 where the polyglycol reactant was a polypropylene glycol of 4,000 average molecular weight, corresponding to about 65-70 oxypropylene units per molecule. The bonded packing was evidently at about the lower molecular size limit for the bonded molecules covering the silica surface, for it showed some peak tailing although successful chromatographic separations were obtained.

EXAMPLE 4

A bonded chromatographic column packing was prepared with polypropylene glycol of 4000 average molecular weight (P-4000) and subjected to the same evaluation as described in Example 1. When examined using n-tetradecane at 100° C. as in Example 1, theoretical plate heights of 0.88 mm were observed for the P-4000 product as compared to 0.45 mm for the bonded E-4000 packing. These hydrocarbons are eluted faster at the same temperatures from the bonded polypropylene glycol columns. As a result, the number of components that can be separated in a given length of time is virtually identical on both bonded columns and both are significantly better than a conventionally coated column packing as noted in Table I.

In addition to the improved efficiency, the longer molecules represented by the polypropylene glycols afford this high efficiency at lower flow rates than the corresponding bonded polyethylene glycols, allowing observation and detection of more volatile components.

EXAMPLE 5

The procedure described above for the preparation of the bonded polyglycol packings was modified to make a corresponding silica having surface-bonded diethylene glycol succinate polymer. Equimolar quantities of diethylene glycol and succinyl chloride (0.0472 g mole each) in o-xylene solution were added from separate dropping funnels to a flask reactor containing about 30 g of chlorosilylated Chromosorb W-AW in refluxing o-xylene under a nitrogen atmosphere. The resulting reaction mixture was quenched by adding about 3 g of diethylene glycol and refluxing an additional half hour. The mixture was then cooled to about 100° C. and 50 ml of methanol were added dropwise with gradual cooling to about 55° C. Liquid was decanted off and the coated silica was washed and dried as before.

The polyester-coated silica was packed into a column similar to that of Example 1 and the column was used to separate a mixture of closely related phenols and cresols (300 μg in ether). The components of the mixture (phenol, o-cresol, o-chlorophenol, p-chlorophenol, 6-chloro-o-cresol, 4-chloro-o-cresol, 2,4-dichlorophenol, and 4,6-dichloro-o-cresol) were all separated efficiently and sharply.

EXAMPLE 6

The procedure of Example 5 was followed in the reaction of chlorosilylated Chromosorb W-AW with 1,12-dodecanediol sebacate polymer, the polymer being formed in situ by reaction of the diol and the acid chloride as before. The reaction mixture was quenched by the addition of 2 g of molten dodecanediol with a one-hour reflux followed by addition of 2 g of diethylene glycol and another 20 minutes of reflux.

The bonded packing thereby produced was found to be particularly useful for analyzing mixtures of nonpolar compounds. For example, it was highly effective for the isothermal chromatographic analysis of three alkanes ($C_{14}$, $C_{15}$, and $C_{16}$) in hexane. It also provided efficient separation of polychlorinated dibenzo-p-dioxin isomers.

EXAMPLE 7

A bonded silica packing was made by the procedure described in Example 5 except that the succinyl chloride was replaced by a mixture of 6.6 g (0.0424 mole) succinyl chloride and 1.2 g (0.0048 mole) γ-cyanopropyl phenyl dichlorosilane. The bonded coating thereby obtained was a polymeric diethylene glycol succinate wherein a tenth of the succinyl groups were replaced by γ-cyanopropyl phenyl silyl moieties. The reaction product was quenched by reacting with diethylene glycol and then with methanol as in Example 5.

The highly polar nature of the bonded silica packing thereby obtained permitted efficient gas chromatographic separation of brominated pentaerythritols, the dibromo and tribromo compounds both eluting in sharp peaks with minimal tailing. This packing also provided improved separating power and considerably reduced analysis time as compared to a conventional coated silicone packing in the separation of components present in crude pentabromochlorocyclohexane.

In all of the bonded polyester packing products described in Examples 5–7 and in other such bonded polyester packings prepared similarly from other diol and dibasic acid reactants, the polyester moieties had a comparatively broad distribution of molecular weights in the approximate range of 1,000 to 20,000 based on examination of the nonbonded polyester byproduct of the reaction.

What is claimed is:

1. A process for making a chromatographic column packing which comprises:
    (1) contacting a silica surface having Si-OH groups with SiCl$_4$ for a time sufficient to react essentially all of said hydroxyl groups, thereby producing a chlorosilylated surface,
    (2) reacting by contacting the chlorosilylated surface with an inert solvent solution of a polyol having an average molecular weight of at least about 3,000 at a temperature of about 100° C.–250° C.,
    (3) contacting the chlorosilylated surface-polyol reaction product at about 50° C.–150° C. with a lower alkanol sufficient to neutralize residual chlorosilyl groups, and
    (4) separating the neutralized product from the reaction mixture as an essentially pure and dry solid.

2. The process of claim 1 wherein gaseous SiCl$_4$ is contacted with the silica surface at about 50° C.–300° C.

3. The process of claim 2 wherein the chlorosilylated surface-polyol reaction product is progressively reacted with at least one polyol of lower molecular weight and finally with methanol.

4. The process of claim 2 wherein the polyol is polyethylene glycol.

5. The process of claim 2 wherein the polyol is polypropylene glycol.

6. The process of claim 2 wherein the polyol is the polyester of an alkylene diol of 2–16 carbon atoms and a dicarboxylic acid of 3–10 carbon atoms.

7. A chromatographic column packing consisting essentially of the product of the process of claim 1.

8. The packing of claim 7 prepared by reacting the silica surface with gaseous SiCl$_4$ and reacting the chlorosilylated surface-polyol reaction product successively with at least one polyol of lower molecular weight and thereafter with methanol.

9. The packing of claim 8 wherein the polyol of at least about 3000 molecular weight is polyethylene glycol.

10. The packing of claim 8 wherein the polyol of at least about 3000 molecular weight is polypropylene glycol.

11. The packing of claim 8 wherein the polyol of at least about 3000 molecular weight is the polyester of an alkylene diol of 2–16 carbon atoms and a dicarboxylic acid of 3–10 carbon atoms.

12. The packing of claim 11 wherein the polyester is that obtained by reacting the alkylene diol with a mixture of the dichloride of the dicarboxylic acid and an organic silicon dichloride.

13. A process for making a chromatographic separation of components contained in a sample which comprises:
    (1) mixing the sample with a carrier gas, and
    (2) contacting the sample-carrier gas mixture with a packing permeable by said mixture and consisting essentially of a silica support having a chemically bonded organic surface coating, said packing prepared by
        (a) contacting a silica surface having Si-OH groups with SiCl$_4$ under conditions whereby essentially all of said hydroxyl groups are reacted, thereby producing a chlorosilylated surface,
        (b) reacting by contacting the chlorosilylated surface with an inert solvent solution of a polyol having an average molecular weight of at least about 3000 at a temperature of about 100°–250° C.
        (c) contacting the chlorosilylated surface-polyol reaction product at about 50°–150° C. with a lower alkanol sufficient to neutralize residual chlorosilyl groups, and separating the neutralized product from the reaction mixture as an essentially pure and dry solid.

14. The process of claim 13 wherein the silica surface of the packing is chlorosilylated by contacting with gaseous SiCl$_4$ at about 50°–300° C.

15. The process of claim 14 wherein the chlorosilylated surface-polyol reaction product is progressively reacted with at least one polyol of lower molecular weight and finally with methanol.

16. The process of claim 15 wherein the polyol of at least about 3000 molecular weight is polyethylene glycol.

17. The process of claim 15 wherein the polyol of at least about 3000 molecular weight is polypropylene glycol.

18. The process of claim 15 wherein the polyol of at least about 3000 molecular weight is the polyester of an alkylene diol of 2–16 carbon atoms and a dicarboxylic acid of 3–10 carbon atoms.

19. The process of claim 18 wherein the polyester is that obtained by reacting the alkylene diol with a mixture of the dichloride of the dicarboxylic acid and an organic silicon dichloride.

20. A chromatographic column containing a packing wherein said packing is prepared by the process of claim 1.

* * * * *

UNITED STATES PATENT AND TRADEMARK OFFICE
CERTIFICATE OF CORRECTION

PATENT NO. : 4,199,330

DATED : April 22, 1980

INVENTOR(S) : Terry J. Nestrick and Rudolph H. Stehl

It is certified that error appears in the above-identified patent and that said Letters Patent are hereby corrected as shown below:

Col. 1, line 7, delete the comma "," after the word "continuation".

Col. 3, line 11, insert a period "." after the word "simultaneously" at the end of the paragraph.

Col. 3, line 31, delete "netralization" and insert --neutralization--.

Col. 3, line 35, delete "30-100" and insert --80-100--.

Signed and Sealed this

Twelfth Day of August 1980

[SEAL]

Attest:

SIDNEY A. DIAMOND

Attesting Officer

Commissioner of Patents and Trademarks